(12) United States Patent
Allen

(10) Patent No.: US 6,425,507 B1
(45) Date of Patent: Jul. 30, 2002

(54) FAIRING ASSEMBLY

(75) Inventor: Scott R. Allen, Fieldbrook, CA (US)

(73) Assignee: Yakima Products, Inc., Arcata, CA (US)

( * ) Notice: Subject to any disclaimer, the term of this patent is extended or adjusted under 35 U.S.C. 154(b) by 0 days.

(21) Appl. No.: 09/585,724

(22) Filed: May 31, 2000

(51) Int. Cl.[7] ............................................... B60R 9/05
(52) U.S. Cl. .................... 224/316; 224/309; 296/180.1; D12/181
(58) Field of Search ................................ 224/309, 316, 224/319; 296/180.1–180.5, 91; 180/903; D12/181

(56) References Cited

U.S. PATENT DOCUMENTS 2,914,231 A * 11/1959 Hornke ........................ 224/316
3,427,067 A * 2/1969 Kish
4,844,529 A * 7/1989 O'Saben ........................ 296/91
5,044,536 A * 9/1991 Gleason ................... 224/316 X
5,386,961 A * 2/1995 Lu

OTHER PUBLICATIONS

Thule 1998 catalog, cover page and p. 29, 1998.

* cited by examiner

Primary Examiner—Gregory M. Vidovich
(74) Attorney, Agent, or Firm—Kolisch Hartwell Dickinson McCormack & Heuser

(57) ABSTRACT

A fairing assembly system and method are provided. The fairing assembly includes a fairing, and a fairing support formed of an integral piece of material including a crossbar mount adapted to receive a crossbar, and a fairing mount adapted to support the fairing. The crossbar mount may include a clip, and the fairing mount may include a fastener configured to secure the fairing to the fairing mount.

21 Claims, 8 Drawing Sheets

FAIRING ASSEMBLY

TECHNICAL FIELD

The present invention relates generally to fairings, and more particularly to fairing assemblies for use with load carriers.

BACKGROUND

Load carriers are devices that attach to the exterior of a vehicle and are used to carry various types of cargo, such as bicycles, canoes, skis, and snowboards. A typical load carrier includes a pair of towers mounted on opposite sides of the vehicle, either to rain gutters, door frames, or specially formed tracks attached to the vehicle roof. A to crossbar extends between these towers, and various accessories, such as luggage racks, cargo cases, canoe supports, bicycle supports, etc., may be mounted to the crossbar. One example of such a load carrier is described in U.S. Pat. No. 6,010,048, the disclosure of which is herein incorporated by reference.

A load carrier and the various attachments that mount thereto often create significant aerodynamic drag, particularly at high speeds. Therefore, users install a fairing on the load carrier to direct wind flow up and over the load carrier structure. The fairing also provides a convenient space for manufacturers to place their logos, and for users to place various stickers acquired while pursuing their recreational activities.

Prior fairings mount to the crossbar of the load carrier device via several multiple-piece bracket assemblies. One problem with these prior bracket assemblies is that assembling the many pieces of these assemblies is complicated and requires time and effort on the part of the user. If one of the pieces is lost, the bracket assembly may become unusable. This complicated assembly is particularly inconvenient for a user who wishes to install and uninstall the fairing to the load carrier repeatedly.

Another problem with prior bracket assemblies is that users are required to bend multiple thin metal strips into alignment with each other in order to install the fairing at the proper angle on the vehicle. It is difficult for users to align these strips in a symmetric manner to position the fairing on the vehicle properly.

SUMMARY OF THE INVENTION

According to one aspect of the invention, a fairing assembly for use with a load carrier mounted to a vehicle is provided. The fairing assembly typically includes a d fairing, and a fairing support formed of an integral piece of material including a crossbar mount adapted to receive a crossbar, and a fairing mount adapted to support the fairing. The crossbar mount may include a clip, and the fairing mount may include a fastener configured to secure the fairing to the fairing mount.

According to another aspect of the invention, a fairing assembly is provided, which includes a fairing and a plurality of brackets configured to couple the fairing to a crossbar. Each of the brackets is typically formed of an integral piece of material, and includes a crossbar mount adapted to receive the crossbar and a fairing mount adapted to support the fairing. Each crossbar mount includes a clip positionable in an at least partially closed position and an open position. The clip is biased to the at least partially closed position. The clip in the open position is configured to receive the crossbar into the clip. The clip in the at least partially closed position is configured to secure and retain the crossbar within the clip.

According to another aspect of the invention, a system for use in protecting a vehicle surface is provided. The system may include a load carrier mounted to the vehicle surface, and a surface contacting structure coupled to the load carrier. The system also includes a protective layer attached to the vehicle surface. The protective layer is positioned intermediate the surface contacting structure and the vehicle surface. Typically, the layer includes a self adhering material that is removable from the surface. The layer may be transparent, and/or a film, but does not typically include glue.

According to another aspect of the invention, a bracket is provided for use in coupling a fairing to a crossbar of a load carrier on a vehicle. The bracket includes a single, integral piece of plastic formed to include a clip sized to attach to the crossbar, and a brace adapted to support the fairing. The clip and the brace typically are positioned at a predetermined angle relative to each other, which may be nonadjustable.

According to another aspect of the invention, a load carrier assembly for securing a load to a vehicle is provided. The load carrier includes a pair of towers coupled to the vehicle, a crossbar extending between the towers, and a fairing. The load carrier also includes a plurality of brackets coupling the fairing to the crossbar. Each of the brackets is formed of an integral piece of material formed to include a clip and a fairing brace. Each clip is clipped to the crossbar in a selectively securable manner, and each fairing brace is attached to the fairing via at least one respective fastener.

According to another aspect of the invention, a bracket for use with a load carrier having a crossbar that extends over a vehicle surface expanse is provided, which includes an integral piece of plastic formed to include a clip configured to mount to the crossbar, and an elongate member coupled to the clip. The elongate member extends outward from the clip and has a height that is substantially thin relative to its length. Typically, the elongate member and the clip are oriented at a predetermined angle from each other. The elongate member may include a vehicle contacting structure configured to be supported by the vehicle surface expanse.

According to another aspect of the invention, a fairing assembly for use with a vehicle load carrier having a crossbar extending over a vehicle surface expanse is provided. The fairing assembly includes a fairing and a plurality of fairing supports configured to support the fairing. Each of the fairing supports is mounted to the crossbar and configured to contact the vehicle surface expanse in a respective discrete location on the vehicle surface expanse.

According to another aspect of the invention, a method of installing a fairing on a crossbar of a load carrier mounted to a vehicle is provided. The method includes providing a plurality of brackets, each bracket including a fairing brace and a clip formed at a predetermined angle to each other. The method also includes securing the fairing to the fairing brace of each of the plurality of brackets to form a fairing and bracket assembly. The method further includes clipping each of the brackets to the crossbar, and adjusting the fairing and bracket assembly until a forward portion of the fairing and bracket assembly is supported by the surface of the vehicle, without bending the angle of the fairing brace relative to the clip.

DETAILED DESCRIPTION OF THE PREFERRED EMBODIMENTS

Figure 1:
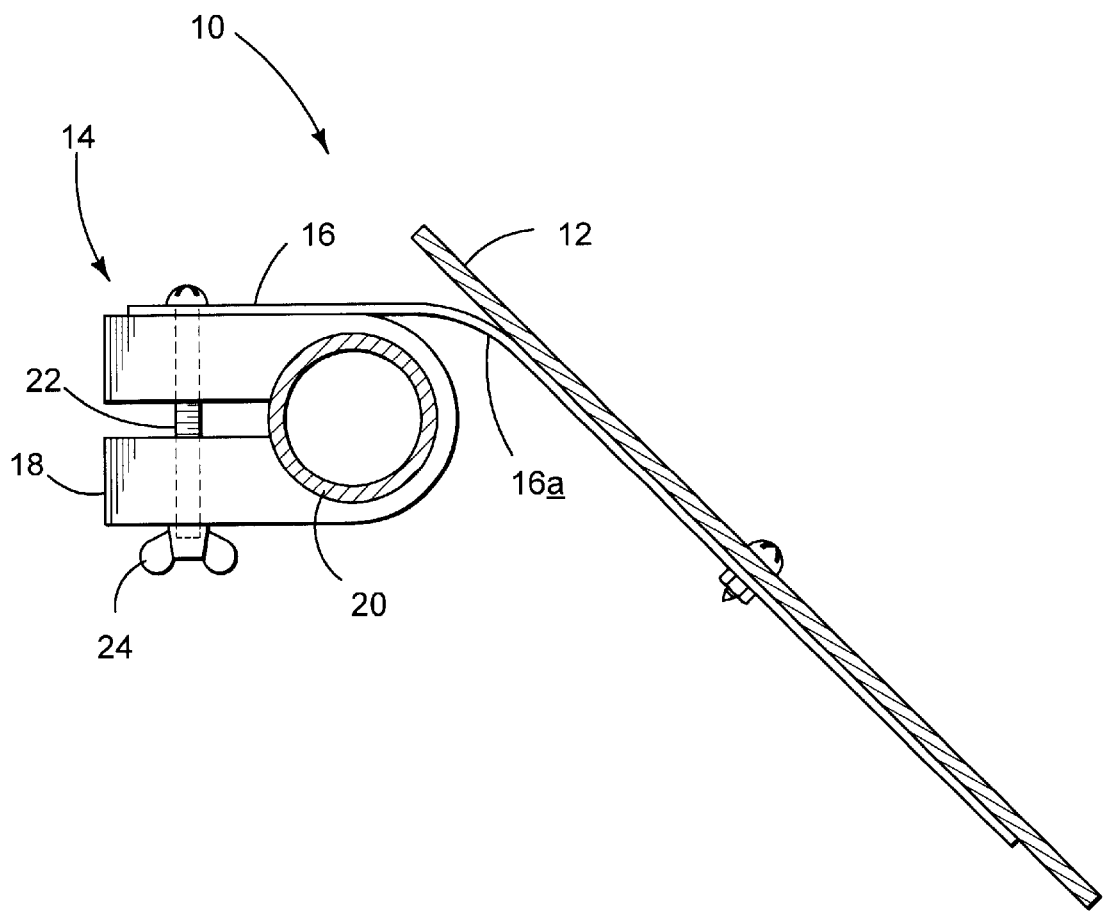
FIG. 1 is a cutaway side view of a prior art bracket assembly.

Referring initially to FIG. 1, a prior art fairing assembly is shown generally at 10. Prior art fairing assembly 10 includes a fairing 12 mounted to a bracket assembly 14. Bracket assembly 14 includes a thin metal strip 16 that a user must bend in region 16a in order to position fairing 12 in an appropriate position on a vehicle. Bracket assembly 14 further includes a coupling 18 configured to clamp to a crossbar 20 of a load carrier via a threaded fastener 22 and wing nut 24. Threaded fastener 22 also serves to secure thin metal plate 16 to coupling 18. It will be appreciated that while a single bracket assembly 14 is shown, prior art fairing assembly 10 includes a plurality of such assemblies spaced apart at intervals along crossbar 20 attached to a single fairing 12.

As described above, prior art fairing assembly 10 is inconvenient, because it is composed of multiple parts that must be assembled and disassembled via threaded fastener 22 each time the fairing assembly is attached to the load carrier crossbar 20. In addition, it is difficult for users to bend thin metal sheets 16 in region 16a to obtain proper alignment of fairing 12 on the vehicle.

Figure 2:
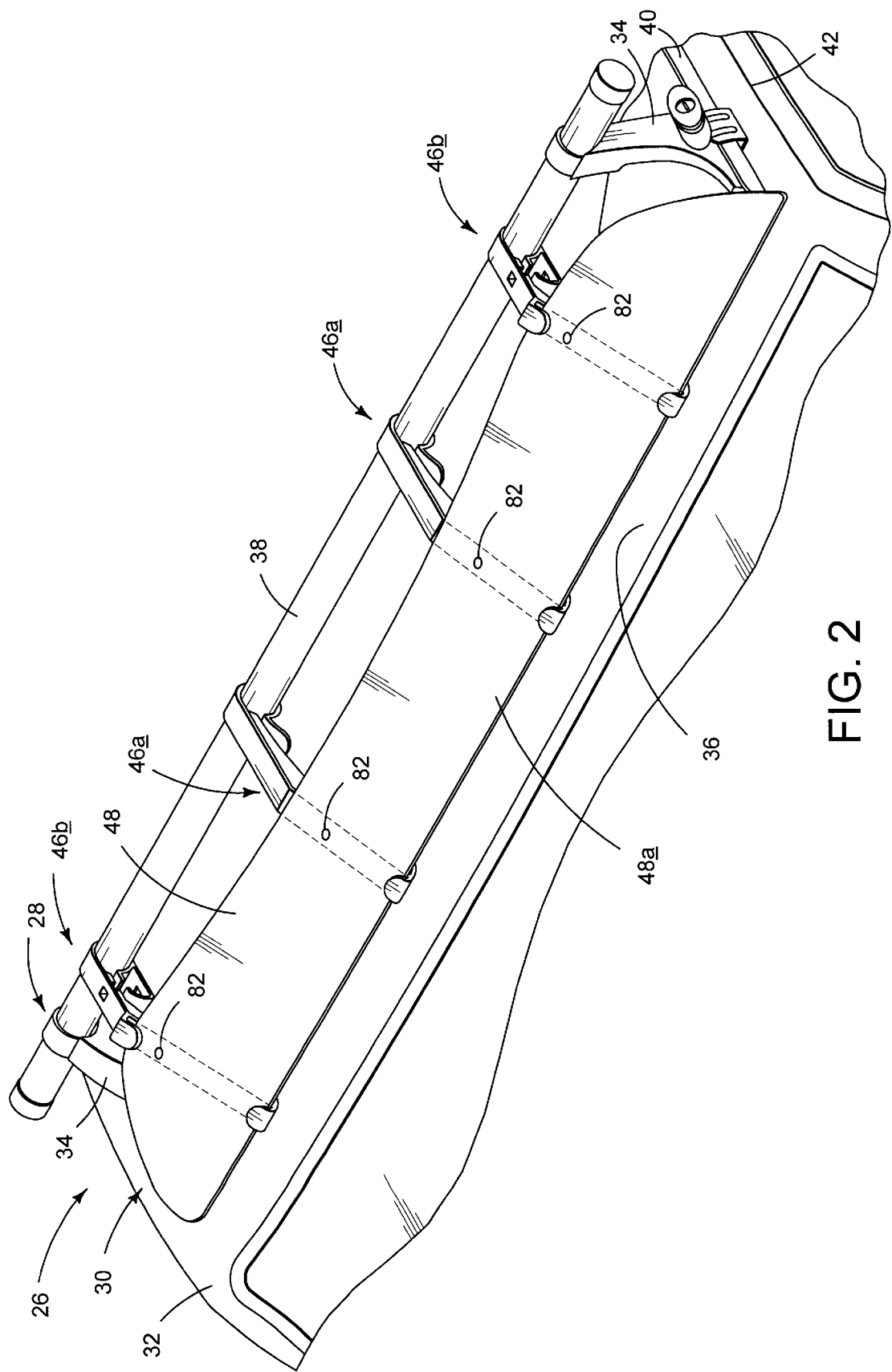
FIG. 2 is an isometric view of a load carrier system and fairing assembly according to one embodiment of the present invention.

Turning now to FIG. 2, a load carrier system 26 including a fairing assembly 30 and a load carrier 28 is shown mounted to a vehicle 32. Load carrier 28 typically includes a pair of towers 34 mounted on opposite sides of vehicle surface expanse 36. A crossbar 38 is attached to each of the towers and spans over the vehicle surface expanse 36.

Typically, crossbar 38 is oriented such that it is perpendicular to a longitudinal axis of the vehicle. Towers 34 typically are attached to rain gutters 40. Alternatively, towers 34 may attach to door frame 42. By way of example, towers 34 may be the towers sold under the brand names "Q Towers," "1A Rain Gutter Towers," "1A HiRise Towers," commercially available from Yakima Products of Arcata, Calif. According to another embodiment of the invention, shown in FIG. 3 and discussed below, the towers may attach to tracks 44 mounted to vehicle surface expanse 36 of vehicle 32. Suitable towers for this embodiment of the invention include the "RailRider" tower commercially available from Yakima Products of Arcata, Calif.

Fairing assembly 30 typically includes a pair of inner fairing supports 46a and a pair of outer fairing supports 46b. Fairing supports 46a, 46b support a fairing 48 in a slightly curved orientation in front of crossbar 38, towers 34, and rain gutters 40, with a lower front portion 48a of fairing 48 positioned adjacent vehicle surface expanse 36. Fasteners 82 secure fairing 48 to the fairing supports. Typically, surface contacting structures, such as feet 96 and 128 of the fairing supports, discussed below, contacts vehicle surface expanse 36 in a plurality of discrete locations. The fairing does not usually directly contact vehicle surface expanse 36, although it alternatively may be configured to do so. The contact between feet 96 and 128 and surface 36 typically is made through protective layer 100 and/or pad 98, although the contact may be direct. It will be appreciated that, while a total of four inner and outer fairing supports 46a, 46 b are shown, fairing assembly 30 may include a larger or smaller number of such fairing supports and may include only a single fairing support. In addition, while both inner and outer fairing supports are shown, fairing assembly 30 may not include both inner and outer supports 46a and 46b.

Figure 3:
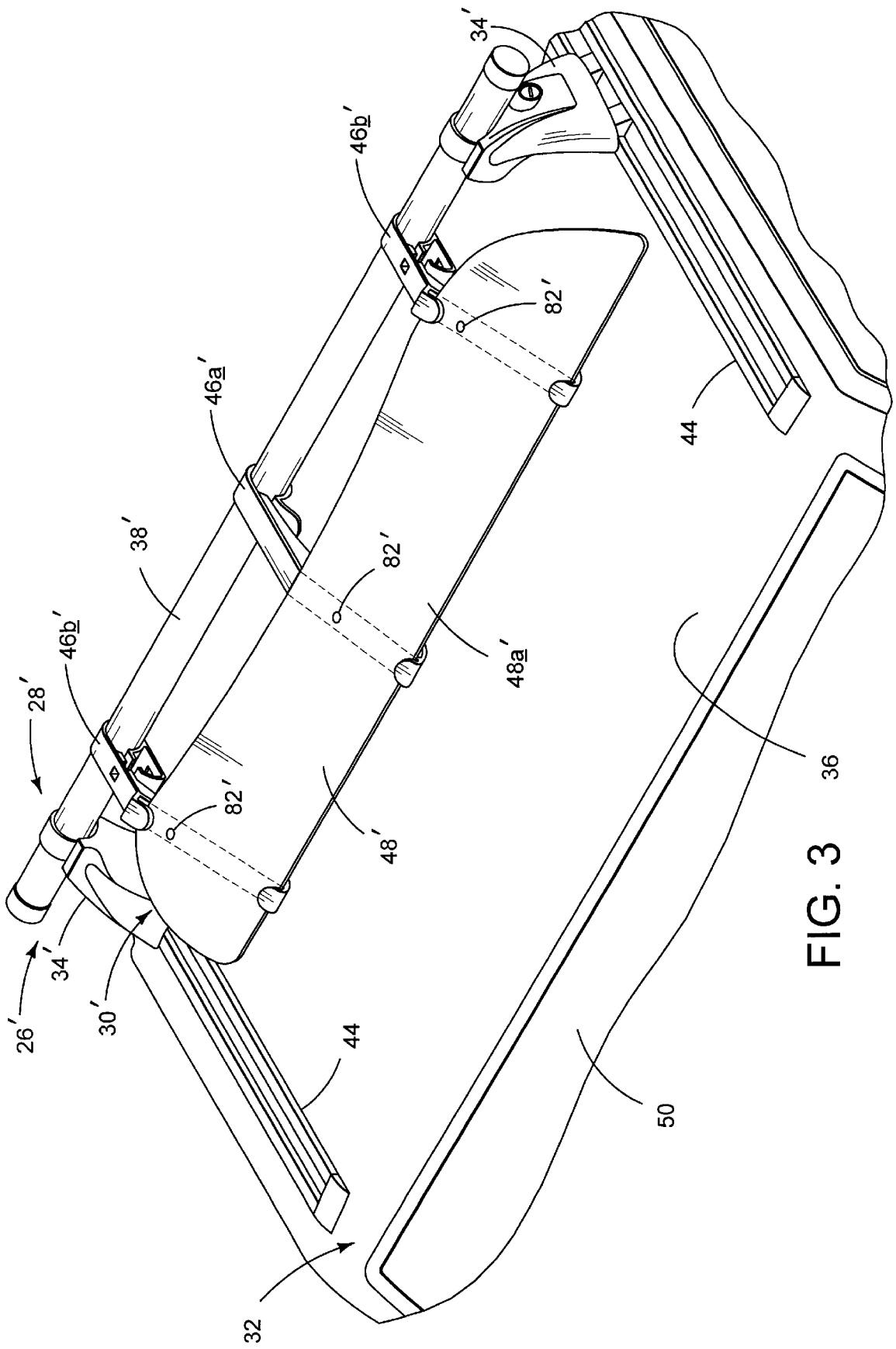
FIG. 3 is an isometric view of a load carrier system and fairing assembly according to another embodiment of the present invention, shown mounted between tracks on a vehicle roof.

In FIG. 3, a load carrier system 26' including a load carrier 28' and a fairing assembly 30' according to another embodiment of the invention is shown. Load carrier 28' typically includes a pair of towers 34' mounted in tracks 44 and configured to support crossbars 38' extending between the towers. Tracks 44 typically are mounted in a spaced-apart orientation, longitudinally, on opposite sides of surface expanse 36.

Fairing assembly 30' typically includes a single inner fairing support 46a' and a pair of outer fairing supports 46b'. The fairing supports are configured to hold fairing 48' in a slightly curved orientation such that a front portion 48a' of fairing 48' is positioned adjacent vehicle surface expanse 36. Usually a surface contacting structure such as feet 96, 128 contacts surface expanse 36, but fairing 48' does not directly contact surface 36. Fairing 48' typically is sized to fit between tracks 44 and typically includes three openings through which fasteners 82' may be inserted to secure the fairing to the fairing supports. Typically, the front portion 48a' of fairing 48' is positioned a distance away from front windshield 50 of vehicle 32.

Fairings 48 and 48' positioned in the orientations shown in FIGS. 2 and 3 guide air flow traveling over vehicle 32 up and over load carrier 28, thereby reducing aerodynamic drag. In addition, the surface of fairings 48 and 48' may be used by manufacturers and vehicle owners alike to place stickers or painted logos, graphics, etc. featuring the names of various companies and products.

As shown in FIGS. 4–7, outer fairing support 46 typically is formed of a single, integral piece of plastic and includes a fairing mount 52 and a crossbar mount 54. Alternatively, another suitable material, such as metal, may be used. Fairing support 46b, as well as fairing support 46a, are referred to herein alternatively as brackets 46a, 46b. It will be understood that fairing supports 46a', 46b' typically are identical to fairing supports 46a, 46b, although variations are possible.

Fairing mount 52 and crossbar mount 54 are typically mounted at a predetermined angle relative to each other. Typically, the predetermined angle is between about 90–180°. In one embodiment of the invention the angle is between about 120–160°, and in the embodiment shown in FIG. 7, the angle is about 140°.

Crossbar mount 54 typically includes a clip 56 coupled to fairing mount 52 by a neck 58. Clip 56 typically includes sleeve 60 configured to wrap around crossbar 38. Clip 56 also typically includes a clamping mechanism 62 having opposed clamping for structures 64, 66 positioned on opposite sides of a sleeve opening 68. Lower clamping structure 66 also is referred to herein as a jaw member 66. Jaw member 66 typically is biased to an at least partially closed rest position shown in solid lines in FIG. 7, and an open position shown in dashed lines in the same figure. When jaw member 66 is in the open position, sleeve opening 68 is sized to receive crossbar 38 into sleeve 60. Once crossbar 38 has been inserted into sleeve 60 through opening 68, jaw member 66 biases closed, thereby securing crossbar 38 within clip 56 of crossbar mount 54. Crossbar 38 may be removed by prying or urging jaw member 66 open until crossbar 38 may be removed from sleeve opening 68.

The upper surface of jaw member 66 is curved inward toward sleeve opening 68. This upper surface acts in tandem with a reinforcing member 92, discussed below, to guide crossbar 38 toward sleeve opening 68 and into sleeve 60. For this reason, jaw member 66 and reinforcing member 92 also are referred to as guides 66, 92.

Figure 4:
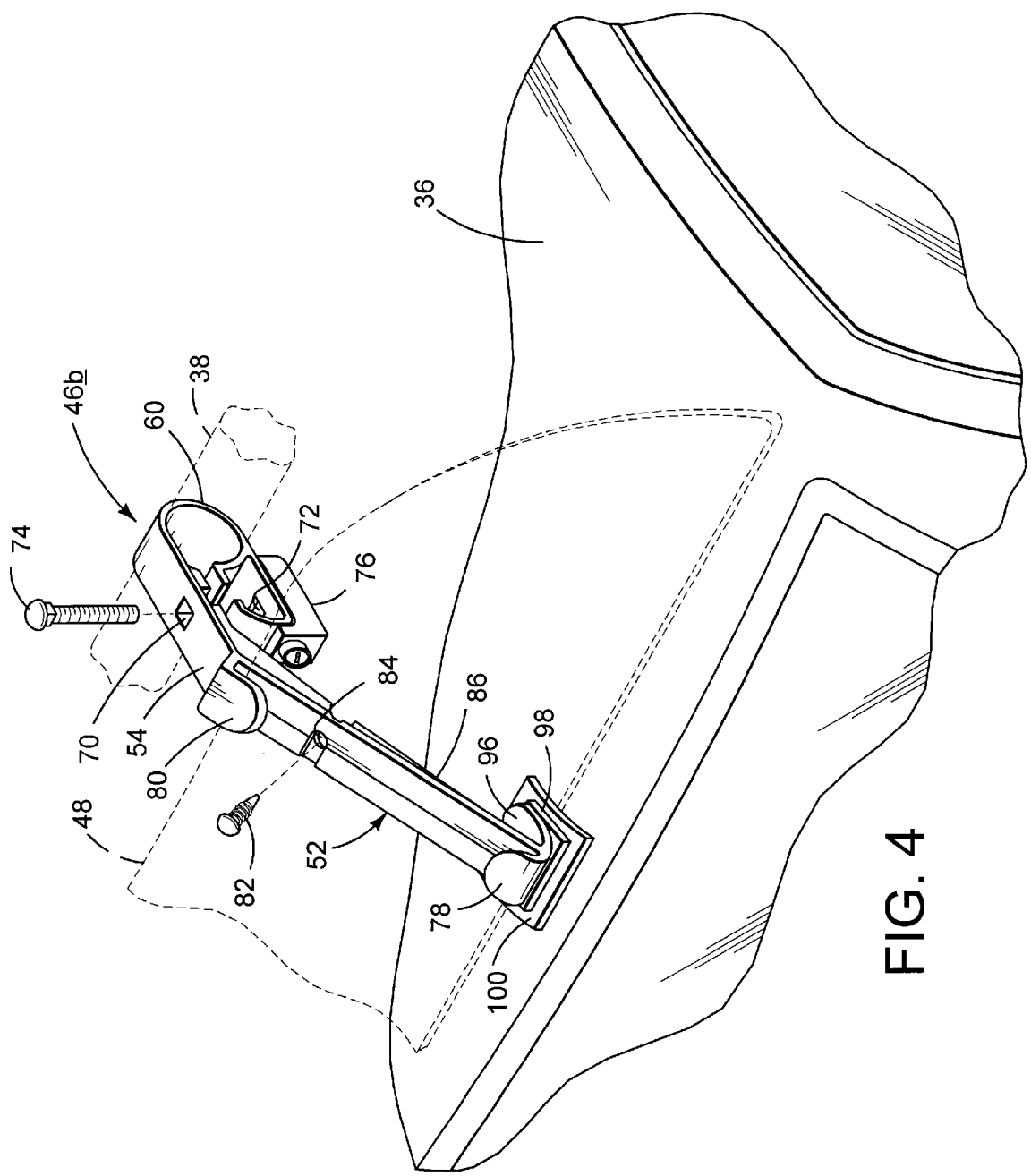
FIG. 4 is an isometric view of an outer fairing support of the embodiments shown in FIG. 2 and FIG. 3.
Figure 5:
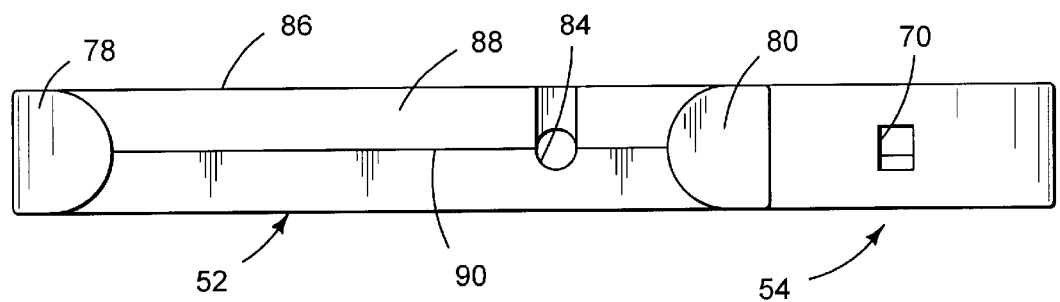
FIG. 5 is a top view of the outer fairing support of FIG. 4.
Figure 7:
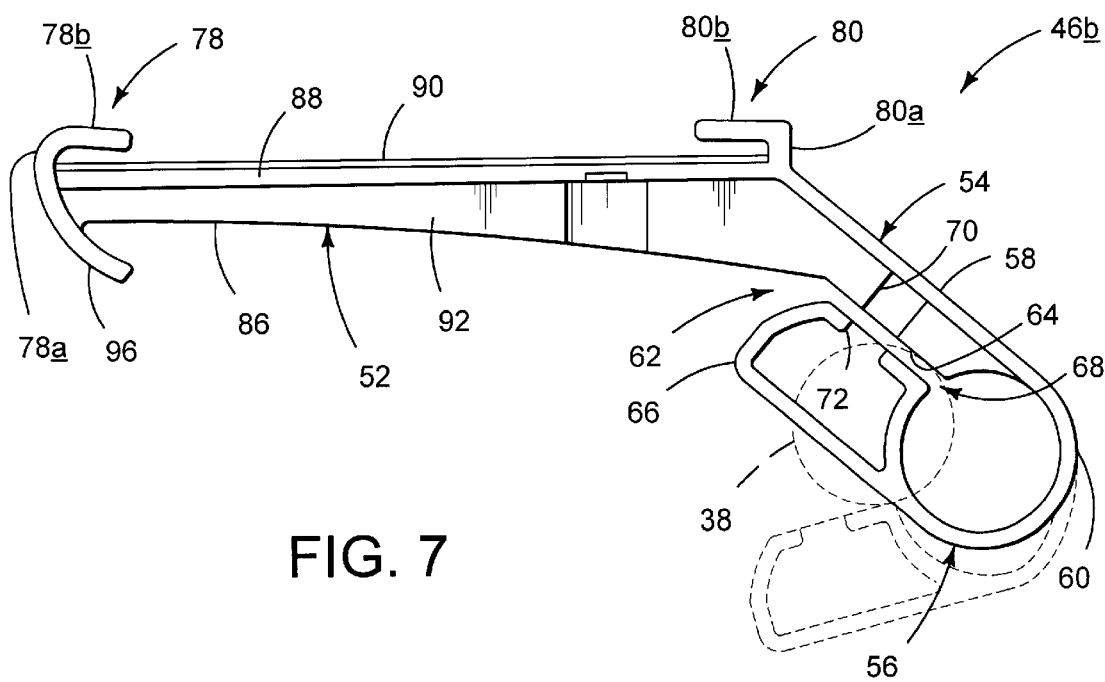
FIG. 7 is a side view of the outer fairing support of FIG. 4.
Figure 6:
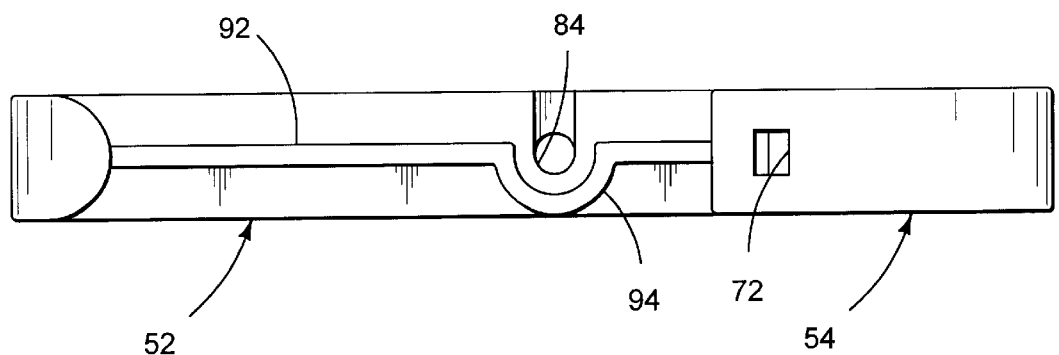
FIG. 6 is a bottom view of the outer fairing support of FIG. 4.
Figure 8:
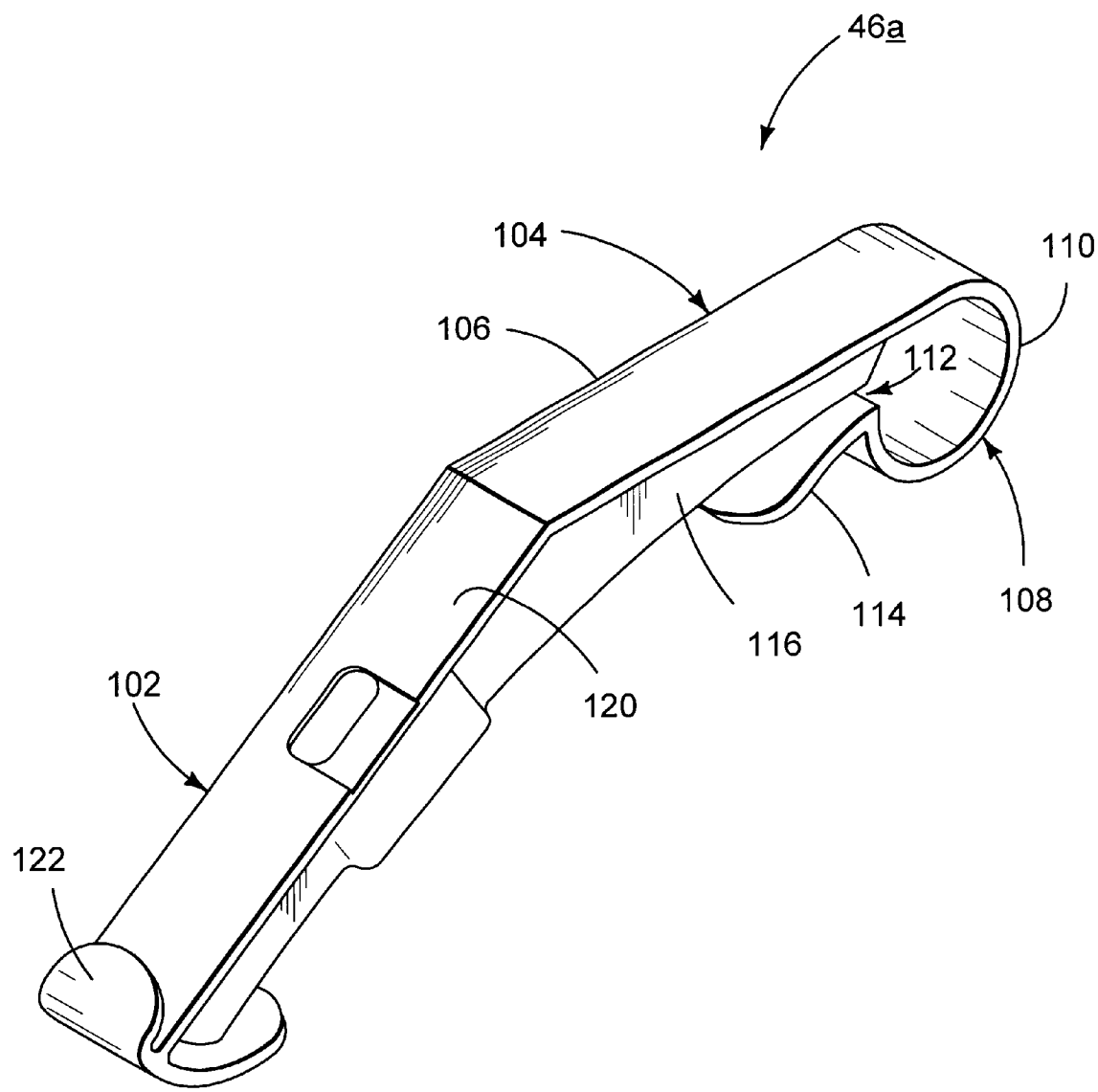
FIG. 8 is an isometric view of an inner fairing support according to the embodiments of FIG. 2 and FIG. 3.
Figure 9:
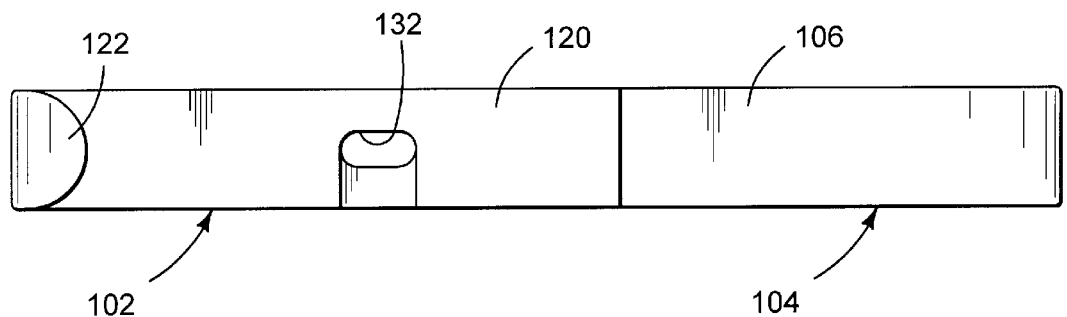
FIG. 9 is a top view of the inner fairing support of FIG. 8.
Figure 11:
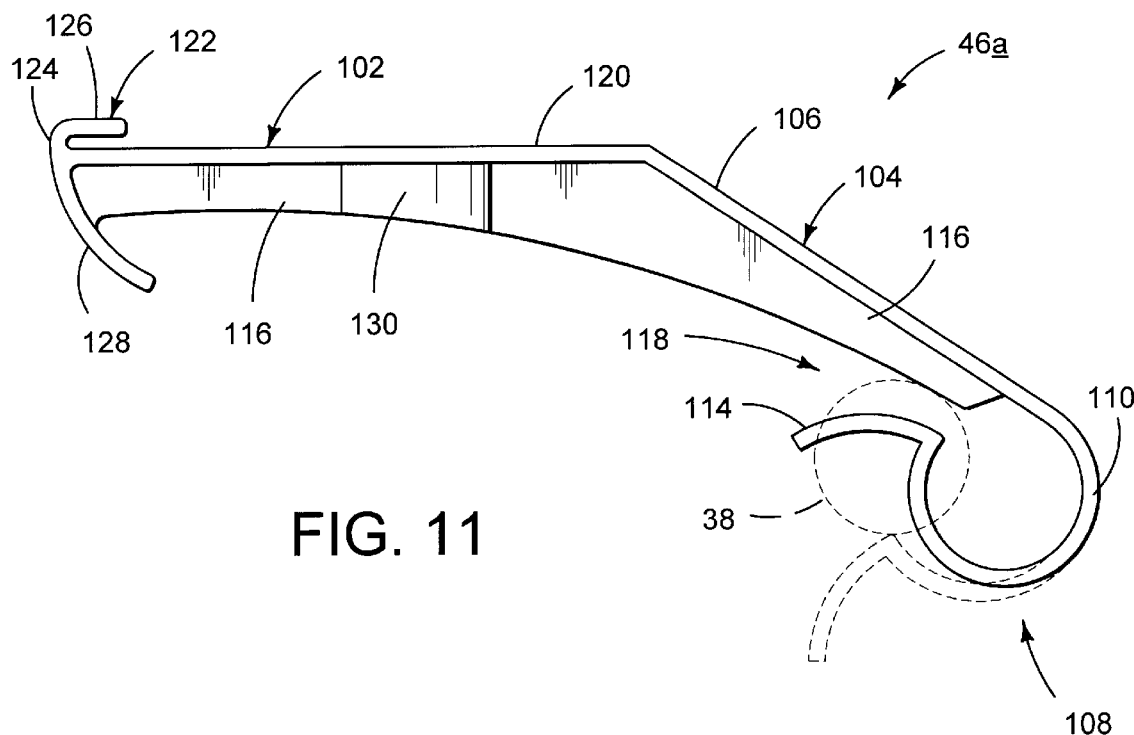
FIG. 11 is a side view of the inner fairing support of FIG. 8.
Figure 10:
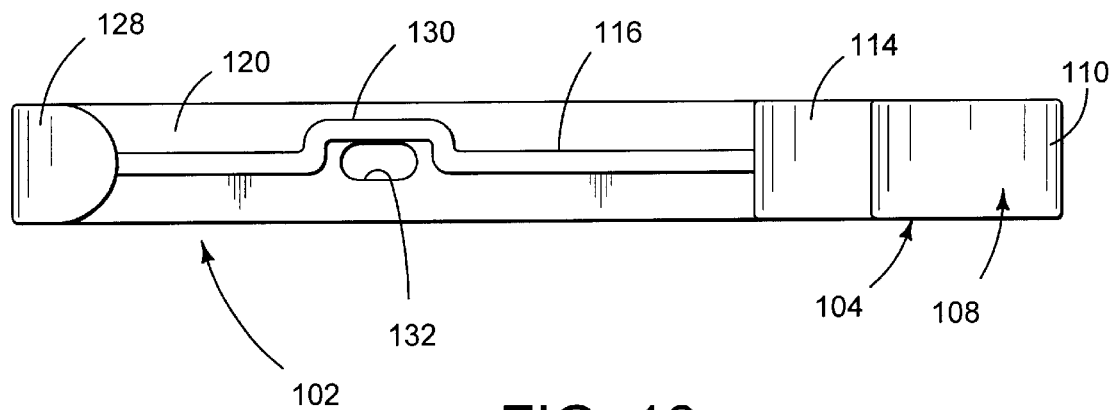
FIG. 10 is a bottom view of the inner fairing support of FIG. 8.

As shown in FIG. 4, a clamping mechanism fastener 74 may be inserted into fastener openings 70, 72 and mate with a locking mechanism apparatus 76, which may be locked and unlocked selectively to lock the fairing assembly 30 to the load carrier 28. Typically, clamping mechanism fastener 74 is a carriage bolt, and locking mechanism apparatus 76 is the SKS accessory lock housing commercially available from Yakima Products of Arcata, Calif. Although clamping mechanism fastener 74 is not shown in FIGS. 2 and 3, it will be understood that the embodiments in FIGS. 2 and 3 may be equipped with fastener 74. Alternatively, another suitable clamping mechanism fastener 74 and locking mechanism apparatus 76 may be used.

Fairing mount 52 typically includes a plurality of fasteners, including lower clip 78, upper clip 80, and plug 82. Plug 82 typically has upwardly turned thread portions such that, after it is inserted, it is difficult to remove from hole 84 and fairing 48. Lower clip 78 and upper clip 80 each has respective upwardly extending portions 78a, 80f, and laterally and inwardly extending portions 78b, 80b which retain fairing 48 within fairing mount 52. Alternatively, outer fairing support 46 may include more or fewer fasteners, and may not include each of fasteners 78b, 80b, and 82. In addition, fasteners 78b, 80b and 82 may be of some other suitable form to secure fairing 48 to fairing mount 54.

Fairing mount 52 also typically includes a brace 86 including a top portion 88 having a peak 90 extending longitudinally down its spine and a lower reinforcing member 92 positioned immediately below and adjacent top portion 88. Reinforcing member 92 includes a curved portion 94 extending around hole 84 and sized to accommodate a lower end of fastener 82. Top portion 88 is divided by peak 90 into angled surface regions on either side of peak 90. Peak 90 is provided on each outer bracket to accommodate curvature in fairing 48. As the fairing curves over top portion 88, it typically contacts only peak 90, and not the side edges of top portion 88. Alternatively, top portion 88 may not include a peak, and/or the fairing may contact the side edges of the top portion 88.

Fairing support 46b further includes a surface-contacting structure such as foot 96 that is configured to be supported by vehicle surface expanse 36. Foot 96 typically is curved such that it contacts vehicle surface expanse 36 only along a predefined narrow contact region, typically a line extended laterally across the bottom of the foot. Alternatively, foot 96 may not be curved. Typically, a resilient pad 98 is mounted to an underside of foot 96. Pad 98 typically is a foam pad, although rubber, felt, plastic, or a variety of other resilient materials may be used. In addition, a protective layer 100 typically is mounted to the vehicle surface expanse in a position immediately below the area where foot 96 and pad 98 come to rest on the vehicle surface expanse.

Protective layer 100 typically is a thin plastic film that is self-adhering, and may be transparent. Protective layer 100 is configured to be removable from vehicle surface expanse 36 by peeling off, without leaving a residue on the surface. Typically, the surface of layer 100 is tacky, but no glue or adhesive is used to adhere layer 100 to surface 36. Alternatively, a glue or adhesive may be used. When fairing assembly 30 is removed from the vehicle, protective layer 100 typically remains attached to the vehicle. Layer 100 typically is not attached to pad 98 or foot 96. The transparent nature of protective layer 100 decreases the negative visual impact on the appearance of vehicle 32.

While protective layer 100 and pad 98 are not shown in the other Figures, it will be appreciated that typically each foot of each fairing support includes such a pad, and a associated protective layer 100 is positioned on vehicle surface expanse immediately below the foot.

In FIGS. 8–11, inner fairing support or bracket 46a is shown to include a fairing mount 102 and a crossbar mount 104. Fairing support 46a is typically formed from a single, integral piece of plastic, however it will be understood that metal or other suitable material may also be used. Typically, the fairing mount is mounted to the crossbar mount at a predetermined angle between 90–180°. In one embodiment of the invention, the predetermined angle is between about 120–160°, and is about 145° in the embodiment shown in FIG. 11.

Crossbar mount 104 typically includes a neck portion 106 attached to a clip 108. Clip 108 typically includes a sleeve 110, a sleeve opening 112, and a lower tab or jaw member 114. Sleeve 110 typically is resilient and biases tab 114 to an at least partially closed rest position, shown in solid lines in FIG. 11. Tab 114 also is selectively positionable in an open position shown in dashed lines, in which the sleeve opening is sized to pass crossbar 38 into sleeve 110. Once crossbar 38 is positioned in sleeve 110, the tab 114 biases to the rest position to secure the crossbar in the sleeve.

The upper surface of tab 114 is curved downward to provide a user a convenient surface to manipulate when opening clip 108. This curvature of tab 114 acts in tandem with brace 116 to guide crossbar 38 into sleeve 110. For this reason, tab 114 and brace 116 also may be referred to as guides 114, 116. In addition, tab 114 and reinforcing member 116 form opposed clamping structures of a clamping mechanism 118.

Fairing mount 102 typically includes an elongate brace 120 coupled adjacent an inner end to neck 106 of crossbar mount 104. Fairing mount 102 also includes a plurality of fasteners configured collectively to hold fairing 48 in position adjacent fairing mount 102. These fasteners include clip 122 formed from upwardly extending portion 124 and lateral portion 126. Lateral portion 126 is configured to hold fairing 48 against a top surface of brace 120. Vertical portion 124 is configured to support a bottom or front portion 48a of faring 48.

Inner fairing support 46a also typically includes a surface-contacting structure such as foot 128. Foot 128 typically is positioned at a lower end of fairing mount 102. Foot 128 is configured to be supported by vehicle surface expanse 36. The bottom surface of foot 128 typically is curved outwardly such that the foot contacts the vehicle surface expanse 36 in a concentrated region, typically a line across the bottom of the foot. Alternatively, the foot may be non-curved, polygonal, etc. Typically, the contact between foot 128 and surface 36 is indirect, although direct contact alternatively may be used. Typically, a resilient pad, such as pad 98, is positioned on the underside of foot 128 and a protective layer, such as protective layer 100, is positioned on vehicle surface expanse 36 in a position underneath the area where foot 128 contacts the vehicle surface expanse 36. Pad 98 and layer 100 are described in detail above.

Reinforcing member 116 typically extends from clip 108 along an underside of neck 106 and further along an underside of fairing brace 120. Reinforcing member 116 typically includes a curved portion 130 extending around a hole 132 formed in fairing mount 102. Hole 132 typically is oblong and sized to accommodate a plug such as plug 82 shown in FIG. 4, which attaches fairing 48 to fairing support 46*a*. Hole 132 is oblong in shape such that fairing 48 and plug 82 may slide longitudinally slightly relative to fairing support 46*a*. Thus, a variety of curvatures of vehicle surface expanses may be accommodated.

While typically fairing assemblies 30, 30' include fairing supports 46*a*, 46*b* and 46*a'*, 46*b'*, as described above, it will be appreciated that numerous variations are possible. Fairing assembly 30 may include a fairing support with a fairing mount of an alternative structure suitable to support fairing 48 over vehicle surface expanse 36, and a crossbar mount of an alternative structure suitable to mount the fairing support to the crossbar.

Figure 12:
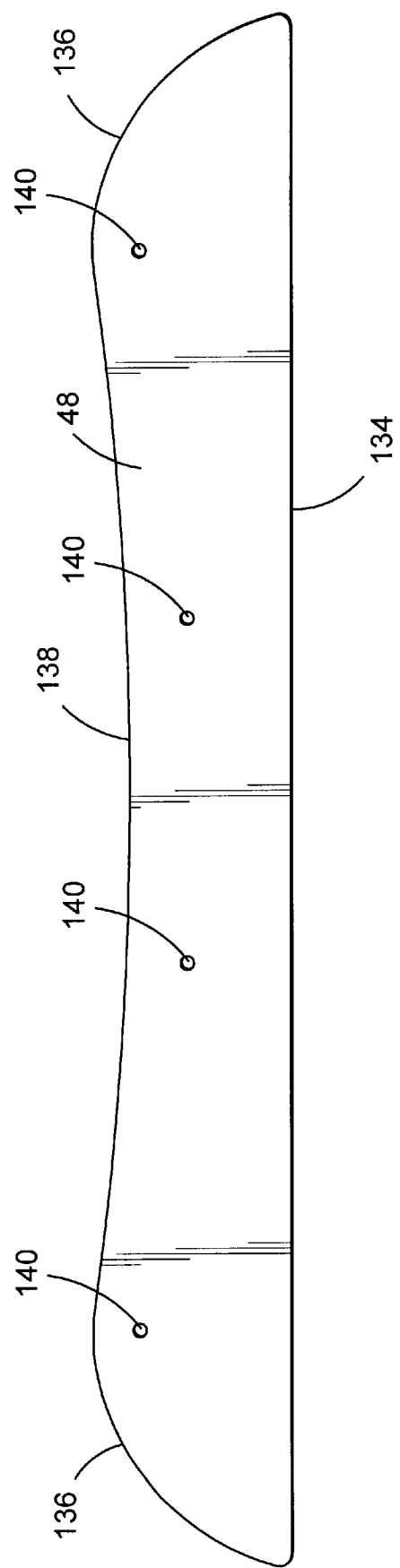
FIG. 12 is a front view of a fairing of the fairing assembly of FIG. 2.

In FIG. 12, fairing 48 is shown disassembled from fairing assembly 30. Fairing 48 includes a flat bottom 134, outwardly curved end portions 136, and an inwardly curved is middle portion 138. Holes 140 are positioned at spaced intervals and are configured to receive a fastener, such as plug 82, to secure the fairing to a fairing support 46*a* or 46*b*. Fairing 48' is similar to fairing 48 in overall shape, but includes three holes, and typically is smaller such that it may be positioned between tracks 44.

According to another embodiment of the present invention, a method of installing a fairing on a crossbar of a load carrier mounted to a vehicle may be practiced. The method typically includes providing a plurality of brackets, such as brackets 46*a* and 46*b*. Each bracket typically includes a fairing mount and a crossbar mount, as described above. The fairing mount typically includes a brace and the crossbar mount typically includes a clip. The clip and the brace usually are formed at a predetermined angle relative to each other, as described above.

The method further includes securing the fairing 48 to the fairing brace of the fairing mount of each of the plurality of brackets to form a fairing and bracket assembly. The method further includes clipping each of the brackets to the crossbar. This typically is accomplished by sliding the fairing and bracket assembly over crossbar 38 such that crossbar 38 travels along the guides of the fairing supports through corresponding sleeve openings and into corresponding sleeves. Once the fairing and bracket assembly is clipped to the crossbar, the method further includes adjusting (typically by rotating) the fairing and bracket assembly until a forward portion 48*a* of the fairing and bracket assembly is supported by the surface expanse 36 of the vehicle 32. This typically is accomplished without bending the angle of the fairing brace relative to the clip. The fairing and bracket assembly typically contacts the surface expanse 36 indirectly through contact of surface-contacting structures and corresponding pads and/or protective layers, as described above.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a", or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A fairing assembly for use with a load carrier mounted to a vehicle, the load carrier having a crossbar, the fairing assembly comprising:
    a fairing; and
    a fairing support including a crossbar mount adapted to receive the crossbar, and a fairing mount adapted to support the fairing; wherein the fairing mount includes a first clip positioned adjacent a bottom end of the fairing, and wherein the fairing mount further includes a second clip positioned adjacent a top end of the fairing, the first clip being configured to secure a lower end of the fairing and the second clip being configured to secure an upper end of the fairing.

2. The fairing assembly of claim 1, wherein the crossbar mount includes a sleeve adapted to wrap around the crossbar.

3. The fairing assembly of claim 2, wherein the crossbar mount includes a sleeve opening through which the crossbar may pass, such that the sleeve may be selectively attached to and removed from the crossbar.

4. The fairing assembly of claim 3, wherein the sleeve assembly includes a jaw member positioned adjacent the sleeve opening.

5. The fairing assembly of claim 4, wherein the jaw member is configured to be moved to an open position by the crossbar as the crossbar is inserted into the sleeve, and return to a closed position once the crossbar is positioned in the sleeve, thereby selectively securing the crossbar within the sleeve.

6. The fairing assembly of claim 3, wherein the crossbar mount includes a clamping mechanism including opposed clamping structures positioned adjacent opposite sides of the sleeve opening.

7. The fairing assembly of claim 6, wherein the crossbar mount includes a clamping mechanism fastener configured to draw the clamping structures together and securely clamp the crossbar within the sleeve.

8. The fairing assembly of claims 7, wherein each of the clamping structures includes a respective opening adapted to receive the clamping mechanism fastener.

9. The fairing assembly of claim 7, wherein the clamping mechanism fastener is a threaded fastener.

10. The fairing assembly of claim 7, wherein the clamping mechanism fastener includes a locking mechanism.

11. The fairing assembly of claim 6, wherein one of the clamping structures of the crossbar mount is coupled to the fairing mount by a neck.

12. The fairing assembly of claim 1, wherein the fairing mount includes a fastener configured to secure the fairing to the fairing mount.

13. The fairing assembly of claim 12, wherein the fastener is a threaded fastener.

14. The fairing assembly of claim 12, wherein the fastener is a pivot plug.

15. The fairing assembly of claim 12, wherein the fastener is a first clip.

16. The fairing assembly of claim 1, wherein the fairing support is formed from an integral piece of material.

17. The fairing assembly of claim 1, further including a foot coupled to the fairing mount, the foot being configured to contact the surface of the vehicle and at least partially support the fairing assembly.

18. A fairing assembly for use with a load carrier mounted to a vehicle, the load carrier having a crossbar, the fairing assembly comprising:

a fairing; and a fairing support including a crossbar mount adapted to receive the crossbar, and a fairing mount adapted to support the fairing; wherein the fairing assembly further includes a foot coupled to the fairing mount, the foot being configured to contact a surface of the vehicle and support the fairing assembly.

19. The fairing assembly of claim 18, further comprising:

a pad mounted to a bottom portion of the foot.

20. The fairing assembly of claim 18, further comprising:

a protective layer attached to the surface of the vehicle underneath the foot.

21. A load carrier assembly for securing a load to a vehicle, the load carrier including:

a pair of towers coupled to the vehicle;

a crossbar extending between the towers;

a fairing; and a plurality of brackets coupling the fairing to the crossbar, each of the brackets being formed of an integral piece of material formed to include a clip and a fairing brace, each clip being clipped to the crossbar in a selectively securable manner, and each fairing brace being attached to the fairing via at least one respective fastener;

wherein the plurality of brackets includes an inner bracket and a pair of outer brackets, each of the inner and outer brackets having respective neck portions coupling the clip to the fairing brace, the neck portion of the inner bracket being longer than the neck portion of the outer brackets to thereby impart curvature to the fairing when the fairing is mounted to each of the brackets.

* * * * *